US008157648B2

(12) United States Patent
Green

(10) Patent No.: US 8,157,648 B2
(45) Date of Patent: Apr. 17, 2012

(54) ACCOUNTING SYSTEM

(75) Inventor: Anthony E. Green, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 154 days.

(21) Appl. No.: 12/845,014

(22) Filed: Jul. 28, 2010

(65) Prior Publication Data

US 2010/0291997 A1 Nov. 18, 2010

Related U.S. Application Data

(63) Continuation of application No. 11/470,094, filed on Sep. 5, 2006, now Pat. No. 7,766,745.

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2006.01) |

(52) U.S. Cl. ................ 463/29; 463/16; 463/20; 463/24; 463/25

(58) Field of Classification Search .................... 463/16, 463/20, 24, 25, 29
See application file for complete search history.

(56) References Cited

U.S. PATENT DOCUMENTS

| | | | |
|---|---|---|---|
| 5,470,079 | A | 11/1995 | LeStrange et al. |
| 6,227,970 | B1 | 5/2001 | Shimizu et al. |
| 6,939,234 | B2 | 9/2005 | Beatty |
| 2004/0133485 | A1 | 7/2004 | Schoonmaker et al. |
| 2006/0154724 | A1 | 7/2006 | Okuniewicz |
| 2007/0207852 | A1 | 9/2007 | Nelson et al. |

*Primary Examiner* — Peter DungBa Vo
*Assistant Examiner* — Wei Li
(74) *Attorney, Agent, or Firm* — David N. Caracappa

(57) ABSTRACT

An accounting system for use with at least one gaming machine having one or more games stored thereon is provided. The accounting system includes a memory means operatively connected to the gaming machine, wherein the memory means comprises a set of active game meters for each active game on the gaming machine, and one set of removed game meters accumulating data corresponding to all games removed from the gaming machine. The accounting system also includes an accounting processor for accessing the game meters and using a theoretical win value to determine the overall gaming machine performance.

3 Claims, 3 Drawing Sheets

ACCOUNTING SYSTEM

Embodiments disclosed herein generally relate to an accounting system for use in a casino gaming system.

BACKGROUND

Generally, casinos attempt to populate the casino gaming floor with games that captivate and maintain player interest. Many electronic gaming machines (EGM) allow games to be inter-changed from the machines as needed without physically moving the gaming machine itself. More particularly, the more popular games may be installed in EGMs and the less popular games may be removed from the EGMs.

Currently, when the game and any associated game content is removed from the EGM, a complete erasure of the EGM's persistent memory is required. In other words, today when the game is removed, the gaming machine must be reset, which includes resetting the accounting meters. Historically, the erasure was required to establish a coherent starting point, without any "out of context" residual meters from the previous game content. If the residual meters had been retained, then there would be complications with calculating the new game performance and the weighted theoretical percentage of the new game or overall EGM. As stated above, historical procedure required a complete erasure of the EGM's persistent memory. This effectively treated the EGM as a newly installed machine with no history of ever being played, or having money and/or credit inserted or dispensed. Any statistical data of the EGM's performance was lost as a result of this erasure.

Another side effect of the aforementioned erasure of EGM's persistent memory is that networked host systems monitoring the EGM are required to close out the accounting books on the EGM and open a new set of accounting books for the EGM with a new identifier. Effectively, this results in the EGM appearing as a completely new unit with a new unique network identifier.

What is needed is an accounting system and method to maintain and manage accounting information for games that have been removed from one or more gaming machines. Additionally, what is needed is an accounting system and method that includes a strategy to restore information associated with removed games from a gaming machine and resume accounting meters at values that were captured at the time a game was removed, all without corrupting the balance of the related accounting meters.

SUMMARY

Briefly, and in general terms, various embodiments directed to an accounting system and method for use with a casino gaming system are disclosed herein. In one embodiment, an accounting system for use with at least one gaming machine having one or more games stored thereon is provided. The accounting system comprises a memory means operatively connected to the gaming machine, wherein the memory means comprises a set of active game meters for each active game on the gaming machine, and one set of removed game meters accumulating data corresponding to all games removed from the gaming machine. The accounting system also includes an accounting processor for accessing the active game meters and the removed game meters to determine the overall gaming machine performance, wherein the accounting processor uses a calculated theoretical win value to determine the overall gaming machine performance.

Another embodiment is directed to a gaming machine, comprising a game display for displaying one or more games stored on the gaming machine. The gaming machine also comprises a memory means operatively connected to the gaming machine, wherein the memory means stores a core set of active game meters for each active game on the gaming machine and stores one set of removed game meters accumulating data corresponding to all games removed from the gaming machine. Additionally, the gaming machine comprises an accounting processor for managing the active game meters and the removed game meters, and for using a calculated theoretical win value to determine the overall gaming machine performance.

In yet another embodiment, a casino accounting system is provided. The casino accounting system comprises one or more gaming machine machines connected via a network connection, wherein each gaming machine comprises one or more games stored thereon. The casino accounting system also comprises a system host in communication with each of the one or more gaming machines and one or more memory means operatively connected to each gaming machine. The memory means comprise a separate set of active game meters for each active game on a particular gaming machine, and one set of removed game meters for the same particular machine, such that the removed game meters accumulate data corresponding to all games removed from the gaming machine. Additionally, the casino accounting system comprises an accounting processor for accessing the active game meters and the removed game meters of each particular gaming machine, wherein the accounting processor uses a calculated theoretical win value to determine the overall gaming machine performance for each particular gaming machine.

These and other features and advantages will become apparent from the following detailed description, taken in conjunction with the accompanying drawings, which illustrate by way of example, the features of the various embodiments.

DETAILED DESCRIPTION

Various embodiments disclosed herein are directed to an accounting system and method for use with a casino gaming system comprising one or more gaming machines. More particularly, the accounting system and method provides a means to reconcile and balance game accounting on a gaming machine that permits games to be deleted and added on the gaming machine.

Figure 1:
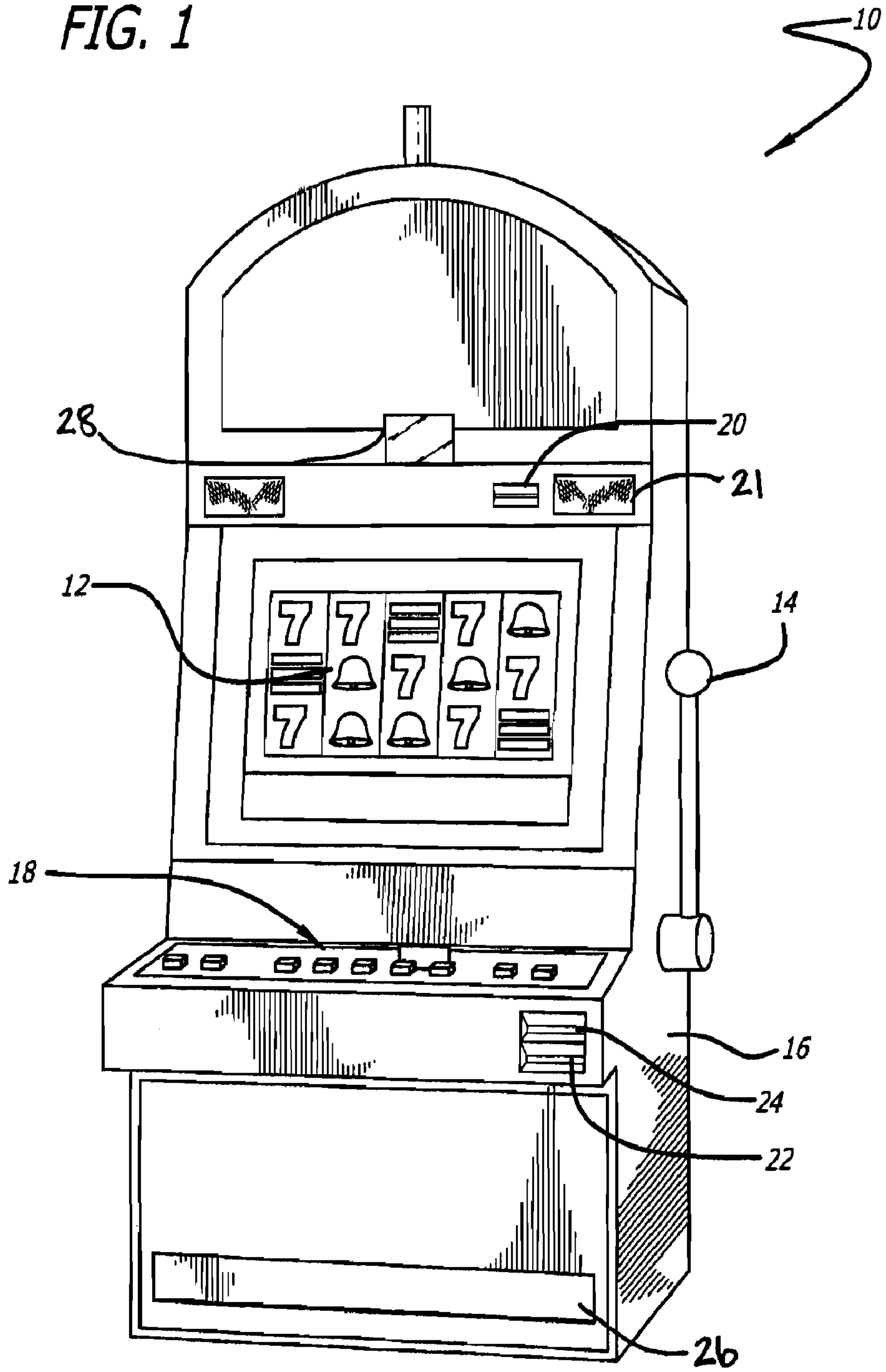
FIG. 1 is an illustration of a gaming machine for use in accordance with an embodiment of the accounting system.
Figure 2:
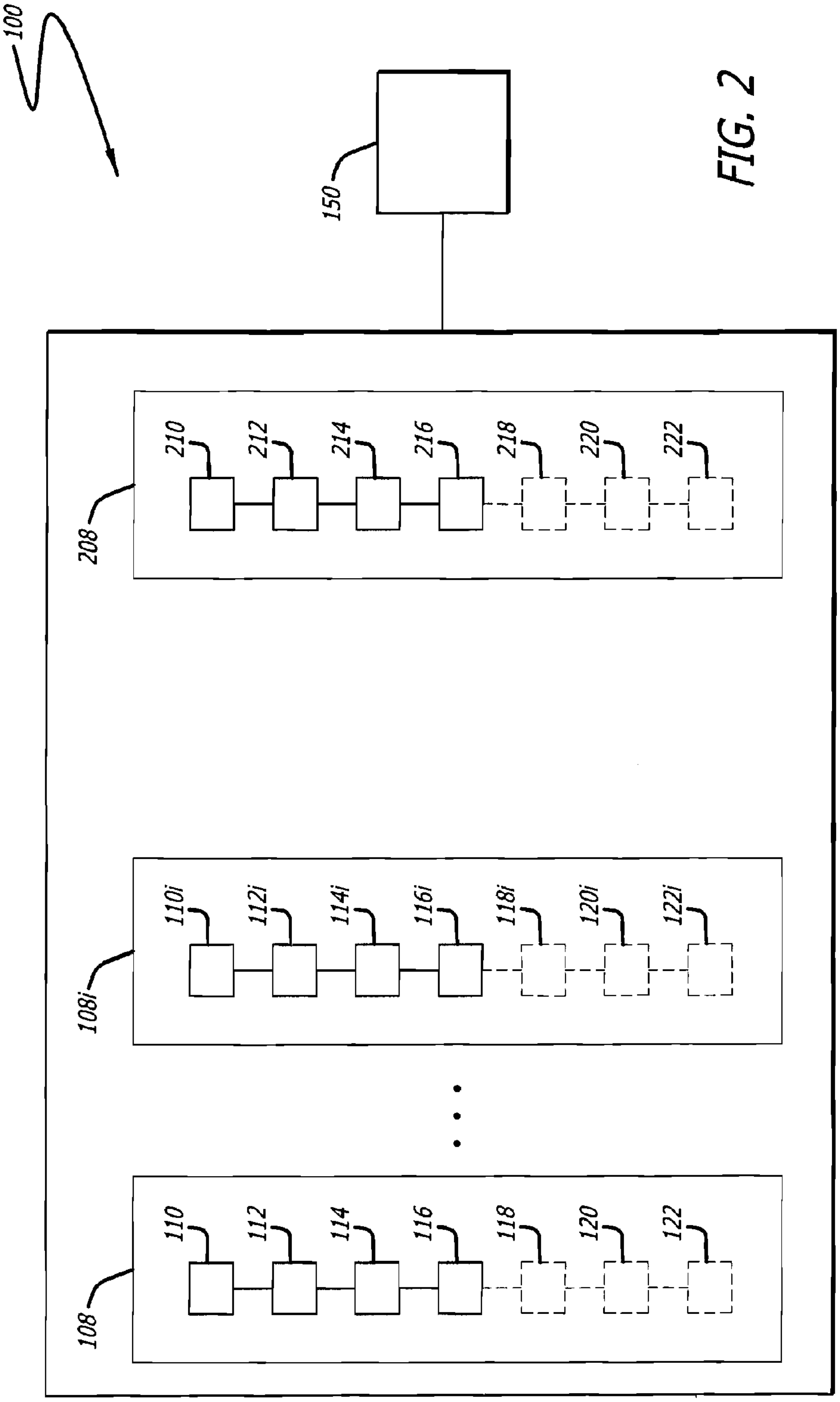
FIG. 2 is an illustration of meter sets for use with a gaming machine in accordance with an embodiment of the accounting system.
Figure 3:
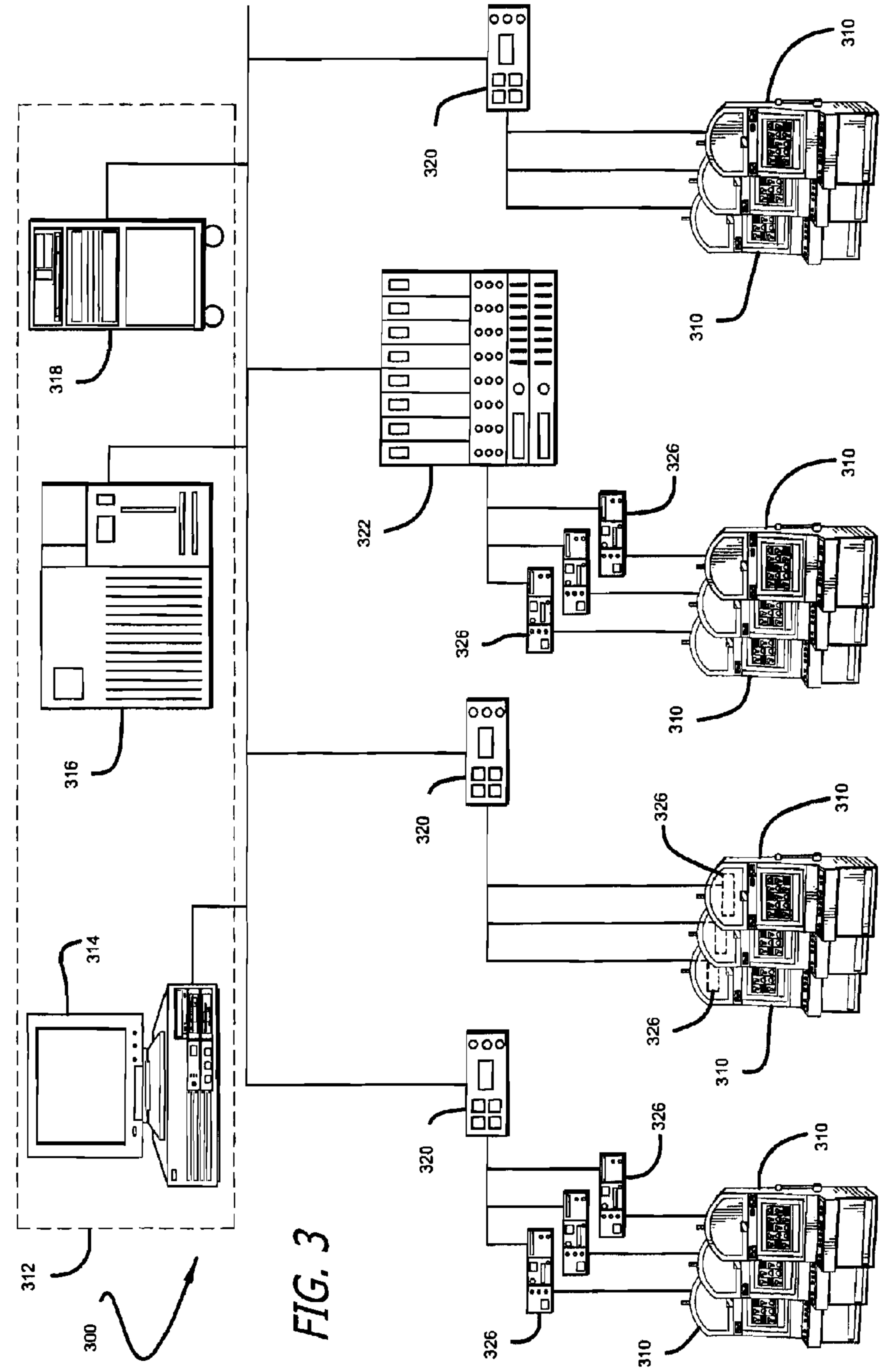
FIG. 3 is a schematic illustration of a casino gaming system for use in accordance with an embodiment of the accounting system.

Referring now to the drawings, wherein like reference numerals denote like or corresponding parts throughout the drawings and, more particularly to FIGS. 1-3, there are shown various embodiments of an accounting system and method for use with a casino gaming system.

Referring to FIG. 1, a gaming machine 10 having a game display 12 is shown. In one embodiment the gaming machine 10 is a gaming machine that allows one or more games to be executed upon it for display in the game display 12. Generally, a game includes a set of symbols combined with a set of probabilities for obtaining combinations and permutations of those symbols, as well as a pay schedule that states the award paid as the result of a particular symbol arrangement. The gaming machine 10 may offer or provide more than one game, but there may be a transitional period where the gaming machine may not have any games available for play.

The gaming machine 10 further includes a cabinet 16. The cabinet 16 is a self-standing unit that is generally rectangular in shape. In other embodiments, the cabinet (not shown) may be a slant-top, bar-top, or table-top style cabinet. However, any shaped cabinet may be used with any embodiment of the gaming machine 10 and sized for a player to be able to sit or stand while playing a game. Additionally, the cabinet 16 may be manufactured with reinforced steel or other rigid materials that are resistant to tampering and vandalism.

Cabinet 16 houses a game management unit (not shown) that includes a CPU, circuitry, and software for receiving signals from the player-activated buttons 18 and a handle 14, operating the games, and transmitting signals to the game display 12 and speakers 21.

The game display 12 presents one or more games of chance such as, but not limited to, mechanical slots, video slots, video poker, video blackjack, video keno, video roulette, or Class II bingo. In alternate embodiments, the game display 12 may present games of skill or games of chance involving some player skill. In various embodiments, the display 12 is a video display such as, but not limited to, a CRT (cathode ray tube), or a thin-panel display. Examples of thin-panel displays include plasma, LCD (liquid crystal display), electroluminescent, vacuum fluorescent, field emission, or any other types of thin panel displays known or developed in the art. Additionally, the video picture may be presented in either a portrait or landscape orientation and utilize standard or widescreen dimensions. Optionally, the game display 12 may also include a touch screen or touch glass system (not shown).

Referring again to FIG. 1, the gaming machine 10 includes a plurality of player-activated buttons 18. These buttons 18 may be used for various functions such as, but not limited to, selecting a wager denomination, selecting a number of games to be played, selecting the wager amount per game, initiating a game, or cashing out money from the gaming machine 10. While the buttons 18 shown in FIG. 1 are mechanical buttons, a touch screen system, touch pad, track ball, mouse, switches, toggle switches, or other input means may be used to accept player input. Optionally, handle 14 may be "pulled" by a player to initiate a game.

Referring back to FIG. 1, a payment acceptor 24 for inserting player money or ticket vouchers into the gaming machine 10 is also included. Additionally, in optional embodiments a player may insert money, coins, tokens, credit cards, debit cards or other payment sources into the payment acceptor 24. Once the player has inserted a form of payment into the payment acceptor 24, the number of credits corresponding to the inserted payment is shown in a credit display (not shown) on the gaming machine 10.

Additionally, the gaming machine 10 may include a coin hopper (not shown) wherein the coins that are immediately available for payouts are held. Traditionally, the coin hopper is a mechanical device that rotates coins into the coin tray 26 when a player collects his credits/coins by pressing a "Cash Out" button.

Optionally, the gaming machine 10 may also include a ticket or voucher printer 22 for dispensing a ticket or voucher that is redeemable for cash. Additionally, in an optional embodiment, the gaming machine 10 may also include a player identification card reader 20 for reading player identification cards.

Generally, the gaming machine 10 also includes a game processor (not shown). The game processor is responsible for functions such as, but not limited to, managing the game, determining coin status, or dispensing player winnings.

Alternately, in an optional embodiment, the gaming machine 10 includes a video display 28 for presenting information such as, but not limited to, game related information, player information, advertisements and casino promotions, graphic displays, news and sports updates, or even offer another game. This information may be generated through a host computer networked with the gaming machine 10 on its own initiative or it may be obtained by request of the player. The player may interact with the video display 28 through use of one or more of the plurality of player-activated buttons 18. Additionally, by way of example, and not limitation, player interaction with the video display 28 may also be fulfilled through use of the video display itself if video display 28 comprises a touch screen or similar technology, by depressing buttons mounted about video display 28 (not shown) which may permit selections such as those found on an ATM machine where legends on the screen are associated with respective selecting buttons, or through use of the keypad (not shown) located beneath video display 28.

In an optional embodiment, the gaming machine 10 may include or is associated with a player tracking system (not shown). Referring to FIG. 1, in one embodiment, the player tracking system (not shown) is operatively connected to a player card reader 20 located on or near the gaming machine 10. In another embodiment, the card reader 20 is capable of reading information contained on a player card and transmitting this information to the player tracking system. In another embodiment, the player tracking system is a player card reader/writer that can read and write information to a player card. Information that may be read from the card includes, but is not limited to, the player's name, rating, and/or accrued points. In another embodiment, the player tracking system includes biometric information including, but not limited to, fingerprints or signatures to verify the identity of the cardholder.

One of ordinary skill in the art will appreciate that not all gaming machines 10 will have all these components and may have other components in addition to, or in lieu of, those components mentioned here. Furthermore, while these components are viewed and described separately, various components may be integrated into a single unit in some embodiments.

The gaming machine 10 also includes an accounting system. Referring to FIG. 2, an accounting system 100 is illustrated that maintains accounting information for active games on a gaming machine 10 and for games that have been removed from the gaming machine. In one embodiment, the accounting system 100 uses two types of meter sets to capture and maintain accounting data. The first type of meter set is a core set of active game meters 108 associated with each active game on the gaming machine 10. The second type is a set of removed game meters 208 dedicated to all games that have been removed from the gaming machine 10. The set of removed game meters 208 accumulate and store game accounting information associated with the removed games, wherein the information is captured prior to each game's removal from the gaming machine 10.

Generally, the accounting system 100 uses data collected from the two types of meter sets 108 and 208 to balance gaming machine accounting information and to determine gaming machine performance. In one embodiment, the accounting system 100 includes multiple active game meter sets 108. A set of active game meters 108 is assigned to each active game on the gaming machine 10 and one set of active game meters 108 is assigned to the gaming machine as a whole. For example, if a gaming machine supports ten different games, then the accounting system would maintain eleven different active game meter sets 108 (e.g. 108*a*, 108*b*, 108*c*, 108*d*, etc). In this scenario, each of the ten active games is assigned its own set of active game meters 108 and the gaming machine as a whole is assigned its own set of active game meters 108.

In one embodiment, each gaming machine 10 includes one set of removed game meters 208. As a game is removed from the gaming machine 10, a subset of the game's accounting information is accumulated in the set of removed game meters 208.

The accounting system 100 also includes an accounting processor 150 for managing and maintaining the metered data. The accounting processor 150 can access the data and manipulate it as needed. For example, the accounting processor 150 can access data from the meter sets 108 and 208. The accessed data can then be used for such purposes as balancing the gaming machine accounting information, determining individual game performance, determining overall gaming machine performance, and for various other accounting purposes known to those skilled in the art.

The accounting processor 150 is operatively connected to a gaming machine 10 (not shown in FIG. 2) that permits the accounting processor 150 and the gaming machine 10 to exchange data. In one embodiment, the accounting processor 150 is housed within a gaming machine 10. In an optional embodiment, the accounting processor 150 is operatively connected to the gaming machine 10, but the accounting processor is physically located outside of the gaming machine 10.

Each set of active game meters 108 and the set of removed game meters 208 include multiple meter components. In one embodiment, the active game meters 108 contain the same meter components as the removed game meters 208. Alternatively, in an optional embodiment the active game meters 108 do not contain exactly the same meter components as the removed game meters 208. Referring back to FIG. 2, in one embodiment, the active game meter set 108 is a core set of active game meters that includes the following meter components: a coin in meter 110, a coin out meter 112, an attendant paid jackpot meter 114, and a theoretical win meter 116. The coin in meter 110 monitors and counts the value of all wagers received by the gaming machine for the particular game. The coin out meter 112 monitors and counts the value of all winnings paid out by the gaming machine for the particular game.

The attendant paid jackpot meter 114 monitors and counts the value of all attendant paid winnings. Typically, if a win exceeds a certain amount, the payout to the player is distributed by an attendant rather than by the gaming machine. The theoretical win meter 116 monitors the amount of money that should be paid out over time for a game. In one embodiment, the theoretical win meter monitors all coin in (or all bets wagered for a game) and multiplies that amount by the game theoretical percentage. The game theoretical percentage is the percentage of winnings a game is programmed to theoretically pay out over time. Generally, the game theoretical percentage is specific to a particular game and is a derived value based upon statistical analysis and gaming regulations. Additionally, the manufacturer or casino typically determines and designates the game theoretical percentage value for a particular game.

In one embodiment, the set of removed game meters 208 includes a coin in meter 210, a coin out meter 212, an attendant paid jackpot meter 214, and a theoretical win meter 216. The value for the coin in meter 210 is the accumulated "coin in" value of all games that have been removed from the gaming machine. The value for the coin in meter 210 may also be represented more conveniently and concisely by the mathematical statement below, where the subscript "r" corresponds with information taken from removed games.

$$CoinIn_r = \sum_i CoinIn_i;\ \forall\ GamesRemoved$$

Similarly, the values for the coin out meter 212, attendant paid jackpot meter 214, and theoretical win meter 216 may be represented as:

$$CoinOut_r = \sum_i CoinOut_i;\ \forall\ GamesRemoved$$

$$AttenPaidJackpot_r = \sum_i AttenPaidJackpot_i;\ \forall\ GamesRemoved$$

$$TheoreticalWin_r = \sum_i CoinIn_i * GameTheoreticalPct_i;\ \forall\ GamesRemoved$$

In one embodiment, in order to balance the gaming machine, the accounting processor 150 will sum the related constituent components of the meter sets 108 and 208. For example, in order to determine the total "coin in" value for a gaming machine the sum of coin in for all active games is added to the accumulated value of the coin in for removed games. This may also be represented more conveniently and concisely by the following expression, where the subscript 'g' corresponds to information taken from individual active games and the subscript "r" corresponds with information taken from removed games:

$$CoinIn = CoinIn_r + \sum_g CoinIn_g$$

The total values for coin out, attendant paid jackpot, and theoretical win meter may be determined in a similar fashion and are represented by the following expressions:

$$CoinOut = CoinOut_r + \sum_g CoinOut_g$$

$$AttenPaidJackpot = AttenPaidJackpot_r + \sum_g AttenPaidJackpot_g$$

$$TheoreticalWin = TheoreticalWin_r + \sum_g CoinIn_g * GameTheoreticalPct_g$$

Additionally, the metered values can be used to calculate game performance. Game performance is defined as the percentage of wager returned to the player over the lifespan of the game. Game performance can generally by expressed as follows:

$$ReturnPct=Win/Wager$$

This expression may be rewritten in different detail in order to accommodate various governmental or jurisdictional requirements. The Win component is segmented into a Coin Out value (machine paid winnings that exclude bonus and progressive amounts) and an Attendant Paid Jackpot value (attendant paid winning that exclude bonus and progressive amounts). Therefore, by restating the Win component as:

$$Win=CoinOut+AttenPaidJackpot$$

and substituting this into the previous expression, the game performance can be rewritten as:

$$ReturnPct=(CoinOut+AttenPaidJackpot)/Wager$$

Additionally, the Wager component of these equations is commonly referred to as Coin In. Substituting the Coin In for Wager yields the final expression:

$$ReturnPct=(CoinOut+AttenPaidJackpot)/CoinIn$$

Additionally, if a gaming machine supports multiple active games, then the single game performance can be expressed as follows, where the subscript "g" is used to identify a particular active game:

$$ReturnPct_g=(CoinOut_g+AttenPaidJackpot_g)/CoinIn_g$$

In summary, the final set of expressions used to determine the return percent are as follows, where the subscript "g" corresponds to specific active games, and the subscript "r" corresponds to removed games:

$$ReturnPct_g=(CoinOut_g+AttenPaidJackpot_g)/CoinIn_g$$

$$ReturnPct_r=(CoinOut_r+AttenPaidJackpot_r)/CoinIn_r$$

$$ReturnPct=(CoinOut+AttenPaidJackpot)/CoinIn$$

Additionally, the actual performance of a gaming machine can be compared to the Weighted Theoretical Percentage (WTP) of the gaming machine. The WTP for a single game is expressed as the Game Theoretical Percentage.

$$WTP=GameTheoreticalPct$$

Calculating the WTP for a gaming machine having multiple games involves summing the adjusted WTP for each game. Using the subscript of "g" to identify game specific values, the adjusted $WTP_g$ is calculated as follows:

$$AdjustedWTP_g=(GameTheoreticalPct_g*CoinIn_g)/CoinIn$$

It is noted that the Coin In value in the divisor of the above expression is the gaming machine's total Coin In. The calculation for WTP of a gaming machine with multiple games is:

$$WTP = \sum_g AdjustedWTP_g$$

$$WTP = \sum_g GameTheoreticalPct_g * CoinIn_g / CoinIn$$

$$WTP = \left(\sum_g GameTheoreticalPct_g * CoinIn_g\right) \Big/ CoinIn$$

In other words, the WTP for a game may be represented as:

$$WTP_g=Theoretical\ Win_g/CoinIn_g$$

and the accumulated WTP for all games removed from the gaming machine may be represented as:

$$WTP_r=Theoretical\ Win_r/CoinIn_r$$

wherein the overall total WTP is represented as:

$$WTP=TheoreticalWin/CoinIn$$

One objective for tracking game performance is to compare it against the theoretical performance. This comparison can be performed in a variety of ways, such as by using performance delta and performance rate. In one embodiment, performance delta and performance rate are represented by the following expressions:

$$PerformanceDelta=ReturnPct-WTP$$

$$PerformanceRate=ReturnPct/WTP$$

For the accounting system 100, the performance delta for a particular active game is determined as follows:

$$PerformanceDelta_g=ReturnPct_g-WTP_g$$

Additionally, for the accounting system 100, the performance delta for the removed games may be represented by the following:

$$PerformanceDelta_r=ReturnPct_r-WTP_r$$

Similarly, the overall performance delta may be represented as follows:

$$PerformanceDelta=ReturnPct-WTP$$

Additionally, the performance rate for an active game and the accumulated removed games, may be represented, respectively as:

$$PerformanceRate_g=ReturnPct_g/WTP_g$$

$$PerformanceRate_r=ReturnPct_r/WTP_r$$

Similarly, the overall performance rate expressions can be written as:

$$PerformanceRate=ReturnPct/WTP$$

Optionally, the accounting system 100 may also be applied to progressive games. In a progressive-type game, each game wager contributes to a total progressive value, and this value is "won" by a player when a specified combination of symbols appears as a result of game play. Generally, in a progressive-type game, progressive wins are accounted for in lieu of a coin out win. In one embodiment including a progressive gaming scheme, the accounting system 100 includes a machine paid progressive meter 118, an attendant paid progressive meter 120 and a progressive theoretical win meter 122. The machine paid progressive meter 118 monitors the progressive win values paid out for a progressive game. Additionally, the attendant paid progressive meter 120 monitors and counts the value of all winnings from a particular progressive game paid out. The progressive theoretical win meter 122 is similar to the theoretical win meter 116 except it meters progressive games only.

As previously discussed, in order to balance the accounting, the accounting processor 150 will sum the related constituent components of the meter sets 108 and 208. The accounting processor 150 will sum the related constituent components of the progressive meters in the same fashion as described above for the non-progressive meters. The totaled values for the collection of machine paid progressive meters 118, the collection of attendant paid progressive meters 120 and the collection of progressive theoretical win meters 122 may be represented, respectively, as follows, where the subscript "g" corresponds to specific active games, and the subscript "r" corresponds to removed games:

$$MachPaidProg = MachPaidProg_r + \sum_g MachPaidProg_g$$

$$AttenPaidProg = AttenPaidProg_r + \sum_g AttenPaidProg_g$$

$$ProgTheoreticalWin = ProgTheoreticalWin_r + \sum_g ProgTheoreticalWin_g$$

where:

$$ProgTheoreticalWin_g = CoinIn_g * (ProgTheoreticalPct_g + GameTheoreticalPct_g)$$

Additionally, the metered values collected for the progressive games can also be used to calculate game performance. The expressions for determining percentage of wager returned for progressive games may be expressed as follows, where the subscript 'g' corresponds to information taken from individual active games and the subscript "r" corresponds with information taken from removed games:

$$ReturnPctProg_g = (CoinIn_g + AttenPaidJackpot_g + MachPaidProg_g + AttenPaidProg_g)/CoinOut_g$$

$$ReturnPctProg_r = (CoinIn_r + AttenPaidJackpot_r + MachPaidProg_r + AttenPaidProg_r)/CoinOut_r$$

$$ReturnPctProg = (CoinIn + AttenPaidJackpot + MachPaidProg + AttenPaidProg)/CoinOut$$

As in the case of non-progressive games, the actual performance of a gaming machine may be compared to the weighted theoretical percentage (WTP) of the gaming machine that includes progressive-type games. The expressions for determining the weighted theoretical percentage of progressive games are described below, where the subscript 'g' corresponds to information taken from individual active games and the subscript "r" corresponds with information taken from removed games:

$$WTPProg_g = ProgTheoreticalWin_g/CoinIn_g$$

$$WTPProg_r = ProgTheoreticalWin_r/CoinIn_r$$

$$WTPProg = ProgTheoreticalWin/CoinIn$$

The performance delta and performance rate expressions for progressive games are expressed as follows:

$$PerformanceDeltaProg_g = ReturnPctProg_g - WTPProg_g$$

$$PerformanceDeltaProg_r = ReturnPctProg_r - WTPProg_r$$

$$PerformanceDeltaProg = ReturnPctProg - WTPProg$$

$$PerformanceRateProg_g = ReturnPctProg_g/WTPProg_g$$

$$PerformanceRateProg_r = ReturnPctProg_r/WTPProg_r$$

$$PerformanceRateProg = ReturnPctProg/WTPProg$$

The accounting system 100, in one embodiment may be applied to a gaming machine having only non-progressive type games. Alternatively, the accounting system 100 may be used with a gaming machine having only progressive type games. Optionally, in another embodiment, the accounting system is suitable for use with a gaming machine having a combination of progressive and non-progressive type games.

Generally, the one or more set of active game meters 108 and the set of removed game meters 208 are operatively connected to the gaming machine 10. In one embodiment, the meter sets 108 and 208 are stored in non-volatile memory. Optionally, the meters may be stored in a reprogrammable, non-volatile memory source such as EPROMs (Erasable Programmable ROM), EEPROMs (Electrically Erasable Programmable ROM), and flash memory.

In an alternate embodiment, the meters are stored in a memory device such as, but not limited to, external memory devices, hard drives, rewritable CD-ROMs, or rewritable DVDs. In an optional embodiment, the meters are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together.

Optionally, in an additional embodiment, the accounting system 100 includes the ability of restoring accounting information related to a removed game. For example, if an active game was removed and the accounting information was captured prior to storing the accounting information in the set of removed game meters 208, then upon reinstallation of the removed game, the accounting system 100 will resume accounting meters at values that were captured at the time the game was removed.

More particularly, in one embodiment, games can be added and deleted electronically, either through networked software download or via removable media. Additionally, in an optional embodiment, it is possible to capture the game state information immediately before removing it. The captured state information may be stored on the networked host server or on a removable type storage media. Optionally, the captured state information may be stored in a storage means on the gaming machine. The captured state information may include data having values from game specific accounting meters immediately before the game was removed. In other words, the captured state information may represent the value on the meter immediately prior to it being accumulated with the removed game meters. Similarly, other game state information could include game history logs that are required by governmental or jurisdictional agencies.

After the game state information has been captured, it is possible to restore the game and its associated state information, including its meters. To perform a game restore, the captured game meters are subtracted from the corresponding accumulating removed game meters 208, and then data is copied into a an available, or "new" set of active game meters 108.

This works for both multi-game and single game applications, provided that the game located at the destination for the restored game was properly removed before restoration.

In one embodiment, game restoration works only with a single gaming machine. In an optional embodiment, game restoration is applied to a whole network of gaming machines.

Game restoration may be concisely represented by a series of expressions. Given that a game was once removed, then restored, the following expressions may be used, where the subscript 'j' corresponds to information associated with the restored game, the subscript 'g' corresponds to information taken from individual active games and the subscript "r" corresponds with information taken from removed games:

$$CoinIn_r = CoinIn_r - CoinIn_j$$

$$CoinIn_g = CoinIn_j$$

$$CoinOut_r = CoinOut_r - CoinOut_j$$

$$CoinOut_g = CoinOut_j$$

$$AttenPaidJackpot_{r'} = AttenPaidJackpot_{r'} - AttenPaidJackpot_{j}$$

$$AttenPaidJackpot_{g} = AttenPaidJackpot_{j}$$

$$MachPaidProg_{r'} = MachPaidProg_{r'} - MachPaidProg_{j}$$

$$MachPaidProg_{g} = MachPaidProg_{j}$$

$$AttenPaidProg_{r'} = AttenPaidProg_{r'} - AttenPaidProg_{j}$$

$$AttenPaidProg_{g} = AttenPaidProg_{j}$$

In an optional embodiment, in order to save additional memory space, fewer meters may be utilized. For example, rather than maintaining a theoretical win meter 116 in the meter set 108, the theoretical win may instead be calculated by multiplying the coin in meter component by the game theoretical percentage.

A theoretical win meter 216 is necessary for the set of removed game meters since the game theoretical percentage is not available after the game is removed from the gaming machine 10.

Additionally, the same scenario applies to the progressive theoretical win accounting meters. In an optional embodiment the progressive theoretical win may instead be calculated by multiplying the coin in meter component by the sum of the progressive theoretical percentage and the game theoretical percentage.

Optionally, in an alternate embodiment the progressive theoretical percentage is isolated from the game theoretical percentage, until the final calculations when they are combined. For example, if the progressive calculations excluded the game calculations then the following expressions could be an equivalent alternative:

$$ProgTheoreticalWin_g = CoinIn_g * ProgTheoreticalPct_g$$

$$ProgTheoreticalWin = \sum_g ProgTheoreticalWin_g$$

$$WTPProg = ProgTheoreticalWin / CoinIn$$

$$ProgTheoreticalWin = ProgTheoreticalWin_{r'} + \sum_g ProgTheoreticalWin_g$$

$$TotalTheoreticalWin_g = TheoreticalWin_g + ProgTheoreticalWin_g$$

$$TotalTheoreticalWin = TheoreticalWin + ProgTheoreticalWin$$

In an alternative embodiment, pre-allocated space (or buckets) in the EGM is designed to hold multiple sets of accounting meters, such that one set of accounting meters is reserved for each game. In this scenario, each time a game is added to the EGM (including the initial game), the added game is assigned to an unused bucket. Each game uses its respective bucket until the game is removed or deleted from the EGM. However, once all of the buckets have been assigned, there is no longer any room to add new games without removing old information. For example, if ten buckets are allocated and eleven games are installed, the eleventh game would require some essential data to be cleared from a bucket so that there would be space to store data from the eleventh game.

Referring to FIG. 3, the gaming machine 10 may be connected to a casino network system 300 having one or more additional gaming machines. The casino network system may include a server system 312. A variety of types of servers may be used as the system server 312. The type of server used is generally determined by the platform and software requirements of the gaming system. Additionally, the system server 312 may be configured to comprise multiple servers. In one embodiment, as illustrated in FIG. 3, the server system 312 is configured to include three servers. Specifically, servers 314, 316 and 318 form the server system 312, or the back-end servers. In one example, server 314 is a Windows® based server, server 316 is an IBM RS6000 based server, and server 318 is an IBM AS/400 based server. Of course, one of ordinary skill in the art will appreciate that different types of servers may also be used. The server system 312 performs several fundamental functions. For example, the server system 312 can collect data from the slot floor as communicated to it from other network components, and maintain the collected data in its database. The server system 312 may use slot floor data to generate a report used in casino operation functions. Examples of such reports include, but are not limited to, accounting reports, security reports, and usage reports. The system server 312 may also pass data to another server for other functions. Alternatively, the system server 312 may pass data stored on its database to floor hardware for interaction with a game or game player. For example, data such as a game player's name or the amount of a ticket being redeemed at a game may be passed to the floor hardware. Additionally, the system server 312 may comprise one or more data repositories for storing data. Examples of types of data stored in the system server data repositories include, but are not limited to, information relating to individual player play data, individual game accounting data, gaming machine accounting data, cashable ticket data, and sound data including optimum audio outputs for various casino settings.

The network bridges 320 and network rack 322 shown in FIG. 3 are networking components. These networking components, which may be classified as middleware, facilitate communications between the system server 312 and the game management units 326. The network bridges 320 concentrate the many game management units 326 (2,000 on average) into a fewer number (nominally 50:1) of connections to the system server 312. Additionally, the network rack 322 may also concentrate game management units 326 into a fewer number (2000:1) of connections to the system server 312. The network bridges 320 and network rack 322 may comprise data repositories for storing network performance data. Such performance data may be based on network traffic and other network related information. Optionally, the network bridge 320 and the network rack 322 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The gaming machines 310, illustrated in FIG. 3, act as terminals for interacting with a player playing a casino game. In various embodiments, any of the gaming machines 310 may be a mechanical reel spinning slot machine, video slot machine, video poker machine, keno machine, video blackjack machine, or a gaming machine offering one or more of the above-described games. Additionally, each gaming machine 310 may comprise one or more data repositories for storing data. Examples of information stored by the gaming machines 310 include, but are not limited to, accounting data, maintenance history information, short and/or long-term play data, real-time play data, and sound data. The sound data may include, but is not limited to, audio files, sound clips, way files, mp3 files and sound files saved in various other formats.

Furthermore, each gaming machine 310 comprises an audio system (not shown) for outputting sound.

Game management units (GMUs) connect gaming machines to network bridges. The function of the GMU is similar to the function of a network interface card connected to a desktop personal computer (PC). Referring to FIG. 3, a GMU 326 connects a gaming machine 310 to the network bridge 320. Some GMUs have much greater capability and can perform such tasks as calculating a promotional cash-back award for a player, generating a unique ID for a cash redeemable ticket, and storing limited amounts of game and transaction based data. Some GMUs may comprise one or more data repositories for storing data. The types of data stored by the GMUs may include, but is not limited to, real-time game data, communication link performance data, real-time player play data and sound data including sound files and audio clips.

In one embodiment, the GMU 326 is a separate component located outside the gaming machine. Alternatively, in another embodiment, the GMU 326 is located within the gaming machine. Optionally, in an alternative embodiment, one or more gaming machines 310 connect directly to a network bridge 320 and are not connected to a GMU 326. Additionally, in an optional embodiment, the accounting processor 150 (illustrated in FIG. 2) is housed in the GMU 326.

Of course, one of ordinary skill in the art will appreciate that a casino gaming system may also comprise other types of components, and the above illustration is meant only as an example and not as a limitation to the types of components used in a casino gaming system.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

The invention claimed is:

1. An accounting system including the ability to restore accounting information associated with a deleted game when restoring that game, comprising:

a gaming machine having at least one active game;

a first memory, coupled to the gaming machine, wherein the first memory comprises a set of active game meters for each active game on the gaming machine, and a single set of deleted game meters accumulating data corresponding to all games deleted from the gaming machine;

a second memory, coupled to the gaming machine, for capturing data representing game state information associated with a game immediately before deleting the game; and an accounting processor for:

accessing the active game meters and the single set of removed game meters to determine the overall gaming machine performance, wherein the accounting processor determines the overall gaming machine performance by comparing a calculated theoretical win value with a return percentage of the gaming machine, wherein the calculated theoretical win value is a theoretical performance of the gaming machine based on a theoretical payout percentage and the active and removed game meters and the return percentage is only based on the active and removed game meters; and restoring the deleted game by removing game state representative data associated with a deleted game from the single set of deleted game meters and restoring the game state representative data into an appropriate one of the set of active game meters before restoring the associated game.

2. The accounting system of claim 1 wherein the second memory for capturing deleted game state representative data may be in one of: (a) a networked host server; (b) a removable type storage media; and (c) the gaming machine.

3. The accounting system of claim 1 wherein the accounting processor removes the game state representative data from the single set of deleted game meters by subtracting the captured game state representative data from the single set of deleted game meters.

* * * * *